US008866590B2

(12) United States Patent
Wolf et al.

(10) Patent No.: US 8,866,590 B2
(45) Date of Patent: Oct. 21, 2014

(54) INSULATING GLASS UNIT WITH AN ELECTRONIC DEVICE AND PROCESS FOR ITS PRODUCTION

(75) Inventors: Andreas Wolf, Huenstetten (DE); Richard Henry Thomas, Vale of Glamorgan (GB); Klaus Puschmann, Bad Schonborn (DE); Peter Schuler, Tiefenbronn (DE)

(73) Assignees: Dow Corning, Midland, MI (US); Bystronic Lenhardt GmbH, Neuhausen-Hamberg (DE)

( * ) Notice: Subject to any disclaimer, the term of this patent is extended or adjusted under 35 U.S.C. 154(b) by 565 days.

(21) Appl. No.: 12/302,697

(22) PCT Filed: May 19, 2007

(86) PCT No.: PCT/EP2007/004479

§ 371 (c)(1), (2), (4) Date: Nov. 26, 2008

(87) PCT Pub. No.: WO2007/137719

PCT Pub. Date: Dec. 6, 2007

(65) Prior Publication Data

US 2009/0243802 A1 Oct. 1, 2009

(30) Foreign Application Priority Data

May 30, 2006 (GB) .................................. 0610634.8

(51) Int. Cl.

| | |
|---|---|
| ***H04Q 5/22*** | (2006.01) |
| ***G08B 13/14*** | (2006.01) |
| ***G08B 21/00*** | (2006.01) |
| ***E06B 3/00*** | (2006.01) |
| ***E04C 2/54*** | (2006.01) |
| ***E06B 7/00*** | (2006.01) |
| ***B32B 7/02*** | (2006.01) |
| ***B32B 17/00*** | (2006.01) |
| ***B32B 17/06*** | (2006.01) |
| ***B31B 1/60*** | (2006.01) |
| ***E06B 3/663*** | (2006.01) |

(52) U.S. Cl.

CPC .................................. *E06B 3/66309* (2013.01)

USPC .... 340/10.1; 340/527.5; 340/540; 340/572.8; 52/204.5; 52/786.13; 52/172; 428/212; 428/410; 428/426; 156/60

(58) Field of Classification Search

CPC B32B 17/00; B32B 17/063; B32B 17/10165; B32B 17/1055; B32B 17/10568; B32B 17/10807; B32B 17/10816; B32B 17/1088; B32B 23/00; B32B 25/00; B32B 25/20; B32B 2307/00; B32B 2307/50; B32B 2309/00; B32B 2319/00; B32B 2323/00; B32B 2581/00; G06K 1/00; G06K 1/14; G06K 3/00; G06K 7/00; G06K 9/00; G06K 2007/00; G06K 2209/00; G06K 7/0008; G06K 2009/00; G07C 2209/14; C08L 7/00; C08L 2201/00; C03C 1/00; C03C 8/00; C03C 14/00; C03C 27/00; C03C 2204/00; C03C 2217/00; C03C 2218/00; C03C 29/00; C03C 2201/00; C03C 2203/00; C03C 2203/10; C03C 2218/13; E06B 3/6604; E06B 3/54; E06B 3/66319

USPC .......... 340/572.7, 572.8, 572.4, 572.1, 573.4, 340/825.34, 825.54, 572.2, 572.5, 10.1, 340/10.2, 10.3, 10.32, 10.42, 10.51, 10.52, 340/10.41, 539.13, 870.11, 825.73, 7.21, 340/825.69, 825.72, 572, 505, 825.31, 340/825.49; 235/375, 385, 492; 428/410

See application file for complete search history.

(56) References Cited

U.S. PATENT DOCUMENTS

| | | | | |
|---|---|---|---|---|
| 4,186,685 | A | | 2/1980 | Chenel et al. |
| 4,696,256 | A | | 9/1987 | Lenhardt |
| 4,730,188 | A | | 3/1988 | Milheiser |
| 4,817,354 | A | | 4/1989 | Bayer |
| 4,831,799 | A | * | 5/1989 | Glover et al. .................. 52/172 |
| 4,994,309 | A | | 2/1991 | Reichert et al. |

| | | | | |
|---|---|---|---|---|
| 5,156,894 | A | 10/1992 | Hood et al. | |
| 5,270,091 | A | 12/1993 | Krysiak et al. | |
| 5,460,862 | A | 10/1995 | Roller | |
| 5,568,714 | A | 10/1996 | Peterson | |
| 5,961,759 | A | 10/1999 | Schubert | |
| 6,121,880 | A * | 9/2000 | Scott et al. | 340/572.5 |
| 6,275,157 | B1 * | 8/2001 | Mays et al. | 340/572.5 |
| 6,369,935 | B1 | 4/2002 | Cardinal et al. | |
| 6,457,294 | B1 * | 10/2002 | Virnelson et al. | 52/786.13 |
| 6,476,708 | B1 | 11/2002 | Johnson | |
| 6,491,966 | B1 | 12/2002 | Lisec | |
| 6,982,640 | B2 * | 1/2006 | Lindsay et al. | 340/540 |
| 2003/0232181 | A1 * | 12/2003 | Simpson et al. | 428/212 |
| 2005/0066961 | A1 * | 3/2005 | Rand | 128/200.14 |
| 2005/0068181 | A1 | 3/2005 | Wang | |
| 2005/0166546 | A1 * | 8/2005 | Reichert | 52/786.13 |
| 2005/0212675 | A1 | 9/2005 | Green | |
| 2005/0212707 | A1 * | 9/2005 | Egbert et al. | 343/702 |
| 2006/0010795 | A1 * | 1/2006 | Ohara et al. | 52/204.5 |
| 2006/0241248 | A1 * | 10/2006 | Foreman et al. | 525/477 |
| 2007/0199255 | A1 | 8/2007 | Paquier | |

FOREIGN PATENT DOCUMENTS

| | | | |
|---|---|---|---|
| CA | 2275448 | A1 | 7/1998 |
| CA | 2607481 | A1 | 11/2006 |
| DE | 20306461 | U1 | 7/2003 |
| EP | 0176388 | A1 | 4/1986 |
| EP | 0714964 | A1 | 6/1996 |
| EP | 0805254 | A2 | 11/1997 |
| EP | 0852280 | A1 | 7/1998 |
| EP | 0916801 | A2 | 5/1999 |
| EP | 1059414 | A2 | 12/2000 |
| EP | 1698455 | A1 | 9/2006 |
| FR | 2294313 | A1 | 7/1976 |
| GB | 2296280 | A | 6/1996 |
| GB | 2315089 | A | 1/1998 |
| GB | 2389138 | A | 12/2003 |
| JP | 10-292742 | A | 11/1998 |
| JP | 2001026467 | A | 1/2001 |
| JP | 2005-301961 | A | 10/2005 |
| JP | 2006-021959 | A | 1/2006 |
| JP | 2006051923 | A | 2/2006 |
| WO | WO 9002696 | A1 | 3/1990 |
| WO | WO 9511363 | A1 | 4/1995 |
| WO | WO 9511364 | A1 | 4/1995 |
| WO | WO 97/06333 | A1 | 2/1997 |
| WO | WO 0036261 | A1 | 6/2000 |
| WO | WO 2000036261 | A1 * | 6/2000 |
| WO | WO 2004039908 | A1 * | 5/2004 |
| WO | WO 2005/076207 | A2 | 8/2005 |
| WO | WO 2005076359 | A1 | 8/2005 |
| WO | WO 2005103430 | A2 | 11/2005 |
| WO | WO 2006005985 | A1 | 1/2006 |
| WO | WO 2006114543 | A1 | 11/2006 |

OTHER PUBLICATIONS

English language abstract for GB 2315089 extracted from espacenet.com database, dated Apr. 10, 2009.

English language abstract for EP 0714964 extracted from espacenet.com database, dated Apr. 10, 2009.

English language abstract for EP 0805254 extracted from espacenet.com database, dated Apr. 10, 2009.

English language abstract for EP 0852280 extracted from espacenet.com database, dated Apr. 10, 2009.

English language abstract for WO 9002696 extracted from espacenet.com database, dated Apr. 13, 2009.

English language abstract for WO 9511363 extracted from espacent.com database, dated Apr. 10, 2009.

English language abstract for WO9511364 extracted from espacenet.com database, dated Apr. 10, 2009.

English language abstract for WO0036261 extracted from espacenet.com database, dated Apr. 10, 2009.

English language abstract for WO2005103430 extracted from espacenet .com database, dated Apr. 10, 2009.

English language abstract for WO 2006114543 extracted from espacenet.com database, dated Apr. 10, 2009.

PCT International Search Report for PCT/EP2007/004479, dated Oct. 2, 2007, 4 pages.

English language abstract and translation for JP 10-292742 extracted from the PAJ database on May 30, 2012, 25 pages.

English language abstract for JP 2001026467 extracted from the PAJ database on May 30, 2012, 8 pages.

English language abstract and translation for JP 2005-301961 extracted from the PAJ database on May 30, 2012, 25 pages.

English language abstract and translation for JP 2006-021959 extracted from the PAJ database on May 30, 2012, 39 pages.

English language abstract for JP 2006051923 extracted from the PAJ database on May 30, 2012, 10 pages.

English language abstract for DE 20306461 extracted from the espacenet.com database on Oct. 12, 2012, 24 pages.

English language abstract for EP 0176388 extracted from the espacenet.com database on Oct. 12, 2012, 29 pages.

English language abstract not available for FR 2294313; however, see English language equivalent US 4,186,685. Original Document extracted from the espacenet.com database on Oct. 12, 2012, 15 pages.

Pete Sorrells, "Passive RFID Basics", Microchip Technology Inc., 1998, 7 pages.

Article, "Plastics Extrusion", extracted from http://en.wikipedia.org/wiki/Plastics_extrusion on Oct. 12, 2012, 8 pages.

Notice of European Opposition for EP2024594, European Patent Office, Sep. 13, 2012, 1 page.

* cited by examiner

*Primary Examiner* — Jennifer Mehmood
*Assistant Examiner* — Mirza Alam
(74) *Attorney, Agent, or Firm* — Howard & Howard Attorneys PLLC

(57) ABSTRACT

A sealed insulating glass unit comprises two glass sheets held apart by a spacer, optionally with a sealant between the edges of the glass sheets outside the spacer. The insulating glass unit contains an electronic device, having information relating to the origin, manufacture and/or properties of the insulating glass unit capable of being read from the device by means actuated from outside the insulating glass unit. The device is embedded within the spacer or sealant so that it is concealed within the insulating glass unit.

9 Claims, 2 Drawing Sheets

INSULATING GLASS UNIT WITH AN ELECTRONIC DEVICE AND PROCESS FOR ITS PRODUCTION

RELATED APPLICATIONS

This application claims priority to and all the advantages of International Patent Application No. PCT/EP2007/004479, filed on May 19, 2007, which claims priority to Great Britain Patent Application No. GB 0610634.8, filed on May 30, 2006.

FIELD OF THE INVENTION

This invention relates to insulating glass units comprising two glass sheets held apart by a spacer, and to the manufacture of such insulating glass units. The insulating glass unit in general comprises at least two glass sheets and may contain more than two panes of glass, for example a triple pane unit comprising a central pane separated from two outer panes by spacers.

BACKGROUND TO THE INVENTION

Insulating glass units and their manufacture are described for example in U.S. Pat. No. 5,961,759, EP-B-805254 and EP-B-714964. The spacer can be a hollow section, generally containing a desiccant, held between the glass sheets by one or more sealant materials. Such a hollow section can be metal, for example an aluminium box spacer such as that described in U.S. Pat. No. 4,817,354, or plastic or a plastic/metal composite as described in U.S. Pat. No. 5,460,862 or EP-B-852280. The spacer can be a mastic layer containing a desiccant and formed around a reinforcement such as a corrugated metal reinforcement, as described for instance in U.S. Pat. No. 5,270,091. The spacer can alternatively be a foamed plastics material containing a desiccant, held between the glass sheets by a sealant, as described for example in U.S. Pat. No. 5,156,894 or U.S. Pat. No. 4,994,309, or the spacer can be a thermoplastic spacer containing a desiccant, which can be used as both spacer and sealant or may be used with an outer sealant layer at the edge of the glass sheets as described in EP-B-916801.

Insulating glass units are widely used in construction, transportation and in manufactured appliances, and are widely exported and traded, often via interim distributors. There is a need for insulating glass unit manufacturers to be able to trace their products, particularly on site for units used in construction or from manufactured articles containing the insulated glass unit, to ascertain whether a unit is genuinely of their manufacture or to identify the source of a defective unit. WO-A-00/36261 describes a glass unit having an electronic label containing in memory digital data concerning the glass (a 'chip') affixed on the inner wall of one of the glass plates.

When such a chip is used, it is important that the chip is concealed from visual detection, even when the IG unit has not yet been glazed into the window frame. The importance of concealing the chip and placing it at an inaccessible place is recognized by WO-A-00/36261, which discusses at length concealing the chip by placing it on the inside surface of one glass pane at a peripheral location which is not visible from the outside in operating position. It further teaches placement of the smart chip in such a manner that it is rendered invisible when the glazing is placed in the rabbet. In terms of placing the RFID device at an inaccessible location, the Catrame patent teaches two options: the chip is either inside the glass unit near the periphery or, in the case of a glass unit comprising a laminated glass pane, embedded into the thermoplastic interlayer of the laminated glass pane. In either location, the chip can be easily visually detected prior to the unit being glazed into the rabbet of the window frame. Furthermore, both options are viable only in conventional glazing, where the glass unit is installed into a frame. A significant market exists for insulating glass units where the edge seal is freely exposed in curtain wall constructions such as in structural glazing or in point-supported glazing.

EP-A-1698455 published on 6 Sep. 2006 describes an electronic tag disposed between the sheets of a laminated glass panel. A shielding layer which interrupts the transmission of light is formed on one of the glass sheets. The electronic tag is coloured so that it is difficult to distinguish from the colour of the shielding layer when seen through the other glass sheet.

SUMMARY OF THE INVENTION

A sealed insulating glass unit according to the invention, comprising two glass sheets held apart by a spacer, optionally with a sealant between the edges of the glass sheets outside the spacer, contains an electronic device, having information relating to the origin, manufacture and/or properties of the insulating glass unit capable of being read from the device by means actuated from outside the insulating glass unit, embedded within the spacer or sealant so that it is concealed within the insulating glass unit.

According to a process for the production of such an insulating glass unit according to one aspect of the invention, the spacer is applied to the glass sheets as a hot melt, and said device is embedded in the spacer while the spacer is molten.

According to a process for the production of an insulating glass unit according to another aspect of the invention, the sealant is applied to the glass sheets in a fluid state, and said device is embedded in the sealant while the sealant is fluid.

DETAILED DESCRIPTION OF THE INVENTION

The information-bearing electronic device can be of the type known as a "smart chip". Such a device generally comprises a memory portion, a signal control circuit portion and a communication circuit portion. One suitable device is a radio frequency identification device (RFID) such as a passive integrated transponder as described for example in U.S. Pat. No. 4,730,188. The means for reading such a device can be a radio frequency reader unit, as described for example in U.S. Pat. No. 4,730,188 or U.S. Pat. No. 6,476,708, which together with the RFID forms a radio frequency transponder system. The radio frequency reader unit can be actuated from outside the insulating glass unit to read information from the RFID. Other RFIDs and reader units can be used.

Operation of the RF transponder system is generally characterized by multiple operating modes including excitation, response and read modes. The RF reader unit is powered during the excitation and read modes. The passive transponder is capable of being activated by the voltage AC signal when its antenna is exposed to an electromagnetic field, for example the field generated by the RF reader unit in excitation mode, so that it is powered during the response mode.

The information recorded in the memory of the electronic device can at its simplest be an identification of the manufacturer of the insulating glass unit, to protect against fake products, but can include key information on the type of insulating glass unit, for example type and/or manufacturer of glass, size, spacer width, type of glass coating, type of gas filling, type of spacer, type of sealant used (primary and/or secondary sealant), any quality test results obtained on component materials of the insulating glass unit, performance rating of the glass unit such as thermal insulation value (“U-value”), solar shading coefficient or transmission, and/or batch number. The information recorded can include the operational parametric setting of the insulating glass manufacturing equipment (for example duration of hold periods during pressing of unit, pressure applied, duration of gas filling operation, gas content) and optionally other environmental parameters, such as ambient temperature or pressure during manufacture.

According to one aspect of the invention, the only information recorded is that available at manufacture, in which case the electronic device is preferably a chip that allows only write-once operation so as to avoid tampering of the information. Alternatively the electronic device can be a rewritable chip, preferably with a security code allowing rewriting only by an authorised user, and the device can be used to record properties of the insulating glass unit measured after manufacture and during storage or use, as discussed in more detail below. The information can be stored in the device memory in encrypted form, so as to avoid casual read-out of the information by non-authorized persons. The electronic device can be concealed within one of the components of the insulating glass unit so that its presence is not readily detected by non-authorised persons.

The insulating glass unit in general comprises at least two glass sheets and may contain more than two panes of glass, for example a triple pane unit comprising a central pane separated from two outer panes by spacers. The glass sheets in the insulating glass unit can be identical panes or can be different, for example one pane may be laminated glass with the other monolithic glass. The glass panes are usually the same size but can be different as known in ‘stepped’ insulating glass units.

The insulating glass unit of the invention can use any of a wide variety of types of spacer. For example, the insulating glass unit can comprise glass sheets (panes) which are held apart and adhered to one another by a thermoplastic spacer. During assembly of such a unit, the spacer is applied as a strand, for example by extrusion, onto a first of the two glass panes along its edge. The beginning and the end of the strand are joined. The glass panes are then assembled and pressed together to a predetermined distance apart, equal to the width that the spacer is to have in the insulating glass unit, so that the strand of thermoplastic material is pressed against the glass panes and bonds the panes together. This process is described in more detail in EP-A433386, EP-A-805254, WO-A-95/11363, WO-A-95/11364 and U.S. Pat. No. 5,961,759.

The thermoplastic material can for example be a polyolefin, for example polyisobutylene, hydrogenated polybutadiene or a poly(alpha-olefin) and/or an elastomeric thermoplastic material such as butyl rubber. It can optionally be modified with reactive groups promoting adhesion to glass, for example silanol or alkoxysilyl groups. A two-part composition can be used in which one component is a polyolefin such as polyisobutylene, hydrogenated polybutadiene or a poly (alpha-olefin) having terminal or pendant alkoxysilyl groups and the other component contains unmodified polyisobutylene, hydrogenated polybutadiene or poly(alpha-olefin) and a filler containing sufficient moisture to cure the alkoxysilyl groups when the two components are mixed just before application to the glass. Such a thermoplastic spacer usually contains a desiccant such as a zeolite molecular sieve, for example at 10 to 50% by weight of the thermoplastic spacer composition, and may also contain other additives such as tackifier, wax and/or stabilisers such as a UV absorber.

Such a thermoplastic spacer can be used alone to act as spacer and to bond the glass sheets together and seal the unit, or can be used with an auxiliary (secondary) sealant layer. If the thermoplastic spacer is used alone, the device is embedded in the spacer. Since the thermoplastic spacer is generally applied to the glass sheets as a hot melt, the device can be embedded in the spacer while the spacer is molten. The device thus becomes concealed within the spacer. An insulated glass unit manufacturer can apply a RF reader to a unit on a construction site or at a distributor to trace whether a unit is of his manufacture without the device being visible.

The auxiliary sealant layer can for example be a layer of silicone elastomer located at the periphery of the insulating glass unit between the edge portions of the glass panes, such that the layer of sealant is in contact with external surface of the spacer, as described in EP-B-916801. Alternative auxiliary sealants include polysulfide, polyurethane, or any other suitable, liquid-applied insulating glass secondary sealant. If an auxiliary sealant layer is present, the electronic device can for example be embedded in the spacer as described above or can be embedded in the sealant layer as the sealant is applied to the insulating glass unit. For example the sealant can be applied to the glass sheets in a fluid state, and said device can be embedded in the sealant while the sealant is fluid, so that the device becomes concealed within the sealant.

The spacer can alternatively be a foamed plastics material, for example a silicone foam or a polyolefin foam such as an ethylene propylene diene terpolymer foam, preferably containing a desiccant as described above. Such a foam spacer is generally fixed between the glass sheets by an adhesive such as a pressure sensitive adhesive, and a sealant is usually applied at the periphery of the insulating glass unit between the edge portions of the glass panes, outside the spacer. The sealant used in such a construction can be a hot melt sealant, a silicone elastomer sealant, a polyurethane sealant, a polysulfide sealant, or any other suitable, liquid-applied secondary sealant. The electronic device can be embedded in the foam during manufacture of the foam.

The spacer can alternatively be a mastic, for example a polyisobutylene mastic, containing a reinforcement which helps to keep the glass sheets the required distance apart when the insulating glass unit is assembled. The mastic can contain a desiccant as described above. The reinforcement can for example be a corrugated metal reinforcement held within the mastic. Such a system can be used with or without an auxiliary sealant layer, for example a layer of silicone elastomer, polyurethane, polysulfide, butyl hot melt or polyurethane reactive hot melt located at the periphery of the insulating glass unit between the edge portions of the glass panes, such that the layer of sealant is in contact with external surface of the reinforced mastic. The electronic device can be embedded in the mastic.

The spacer can alternatively be can be a hollow section, for example an aluminium or stainless steel section or a hollow section of rigid plastics material, generally containing a desiccant, held between the glass sheets by one or more sealant materials. A single sealant can be used to surround the hollow section, or a first sealant can be used to seal the joint between the hollow section and the glass panes, and an auxiliary sealant layer, for example a layer of silicone, polyurethane or polysulfide elastomer or a hot melt secondary sealant, can be used located at the periphery of the insulating glass unit between the edge portions of the glass panes, such that the layer of sealant is in contact with external surface of the hollow section. The electronic device can be positioned within a hollow spacer provided that the hollow section does not provide electromagnetic shielding; that is the electronic device can usually be positioned within a hollow plastic spacer but usually not within a hollow metal spacer.

In all constructions, including foamed spacers, reinforced mastic spacers and hollow section spacers, in which an auxiliary or secondary sealant layer is present between the edges of the glass sheet outside the spacer, the electronic device can be embedded in the sealant, for example the sealant can be applied to the glass sheets in a fluid state, and said device can be embedded in the sealant while the sealant is fluid.

Where the spacer is a solid preformed spacer such as a hollow section spacer or a foamed plastic spacer, the electronic device can be attached to the spacer by a suitable adhesive, for example a room temperature vulcanisable silicone adhesive, a hot melt adhesive or a pressure sensitive adhesive, in a position whereby the device becomes embedded in the sealant. The device should preferably not be positioned between the spacer and either glass sheet, as this could potentially negatively affect the seal between the spacer and the glass.

The invention can be utilised most fully in insulating glass units produced by automated in-situ applied spacer systems controlled by a central unit, since then key product parameters that are relevant for the quality of the insulating glass unit can be transferred from the central control unit to the information device during production.

One property that may be of interest to record is the gas content (degree of gas filling) of the insulating glass unit upon manufacture. The gas content can be measured by various means, for example it can be measured during production if gas filling is part of an automated system as described above. Alternatively, the gas content (typically argon gas) in a finished insulating glass unit can be measured, for example by a 'Sparklike' sensor from Sparklike, Ltd. of Helsinki, Finland or an oxygen analyser from Gas Sensor Solutions Ltd. of Dublin, Ireland, and recorded on the electronic device. Other properties of the insulating glass unit that can be measured upon manufacture and recorded are for example humidity and/or temperature during manufacture, the thermal insulation value ("U-value"), solar shading coefficient or transmission of the glass unit. If the electronic device is a rewritable chip, environmental exposure properties or other properties can also subsequently be measured during storage and use of the insulating glass unit, and can be recorded by the device together with the date on which they were measured.

The invention will now be described with reference to the accompanying drawings, of which FIG. 1 is a diagrammatic cross-section of one type of insulating glass unit;

Figure 1:
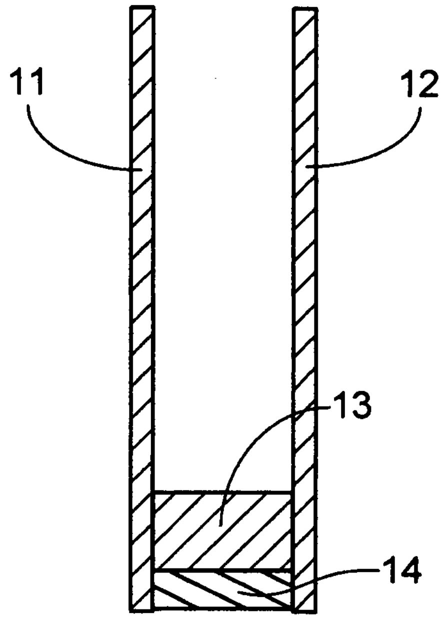

The insulating glass unit of FIG. 1 comprises glass panes 11, 12 separated by a spacer 13 of the thermoplastic type which is formed in situ and comprises for example polyisobutylene filled with a desiccant. A secondary seal 14, for example of silicone elastomer, is formed at the edge of panes 11, 12 in contact with the outer surface of the spacer 13. Edge-seal systems for such units are sold commercially under the Trade Mark 'Lenhardt TPS System'. The electronic information-bearing device can be incorporated in the thermoplastic spacer 13 as it is applied to first glass pane 11 or in the sealant 14 as it is applied to the unit.

Figure 2:
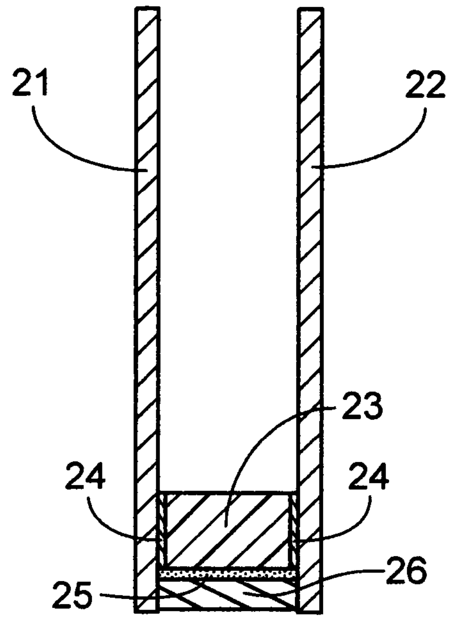
FIG. 2 is a diagrammatic cross-section of an alternative type of insulating glass unit.

The insulating glass unit of FIG. 2 comprises glass panes 21, 22 separated by a spacer 23 formed of plastics foam, for example silicone foam or ethylene propylene diene terpolymer foam containing desiccant. The foam spacer 23 is secured in position by adhesive layers 24, for example of acrylic pressure sensitive adhesive. The outer surface of the foam spacer 23 is covered by a gas barrier film 25, for example of 'Mylar' (Trade Mark) polyester. A sealant 26, for example a hot melt sealant, is applied outside the film 25 at the edge of panes 21, 22. Edge seal systems for such units are sold commercially under the Trade Mark 'Edgetech Super Spacer'. The electronic information-bearing device can be incorporated in the sealant 26 as it is applied to the unit.

Figure 3A:
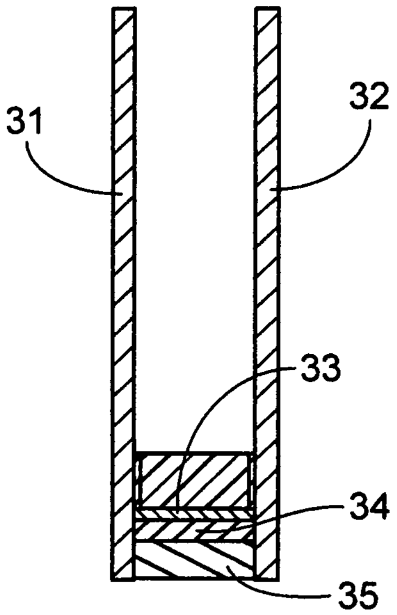
FIG. 3A is a diagrammatic cross-section of another alternative type of insulating glass unit.
Figure 3B:
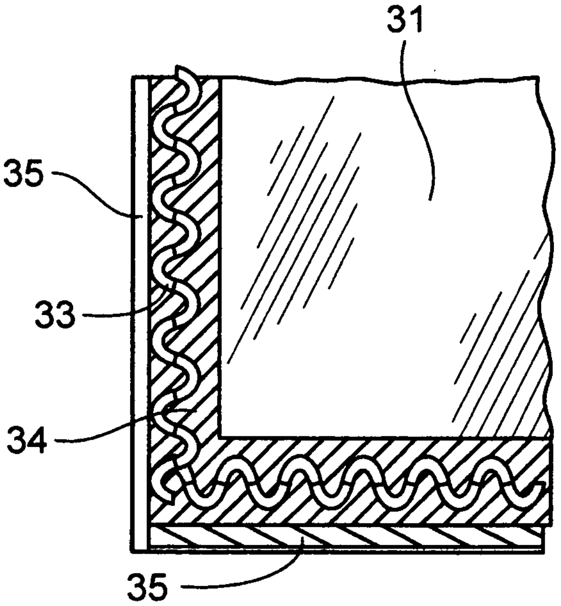
FIG. 3B is a diagrammatic sectioned side view of the insulating glass unit of FIG. 3A.

The insulating glass unit of FIGS. 3A and 3B comprises glass panes 31 and 32. The spacer separating panes 31, 32 comprises a corrugated metal reinforcing sheet 33 surrounded by a mastic 34, for example a polyisobutylene mastic filled with a desiccant. A secondary seal 35, for example of silicone elastomer, is formed at the edge of panes 31, 32 in contact with the outer surface of the mastic 34. Edge seal systems for such units are sold commercially under the Trade Mark 'TruSeal Swiggle Strip'. The electronic information-bearing device can be incorporated in the mastic 34 as it is applied around the reinforcement 33 to form the spacer, or in the sealant 35 as it is applied to the unit.

Figure 4:
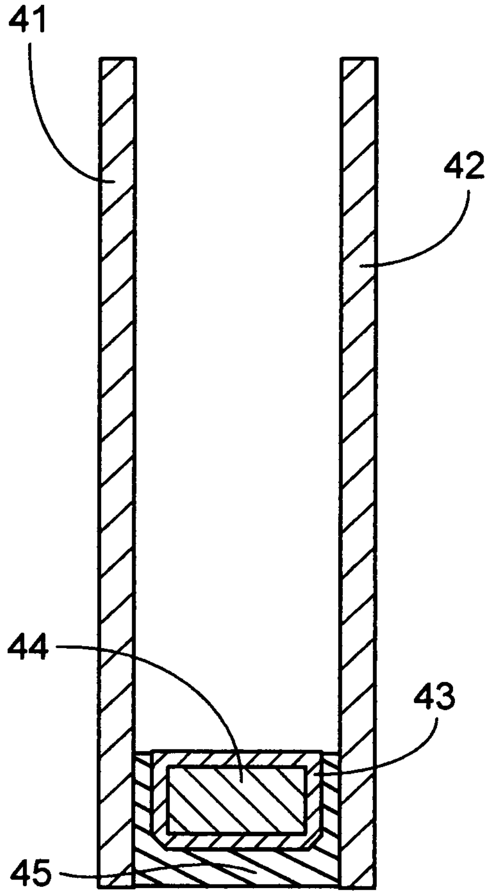
FIG. 4 is a diagrammatic cross-section of another alternative type of insulating glass unit.

The insulating glass unit of FIG. 4 comprises glass panes 41, 42 separated by an aluminium box spacer comprising an aluminium hollow section 43 containing a desiccant 44. FIG. 4 shows a single seal unit in which a single sealant 45 bonds the aluminium box 43 to the panes 41, 42 and seals the outer edge of the panes 41, 42 outside the box 43. The electronic information-bearing device can be incorporated in the sealant 45 as it is applied to the unit.

Figure 5:
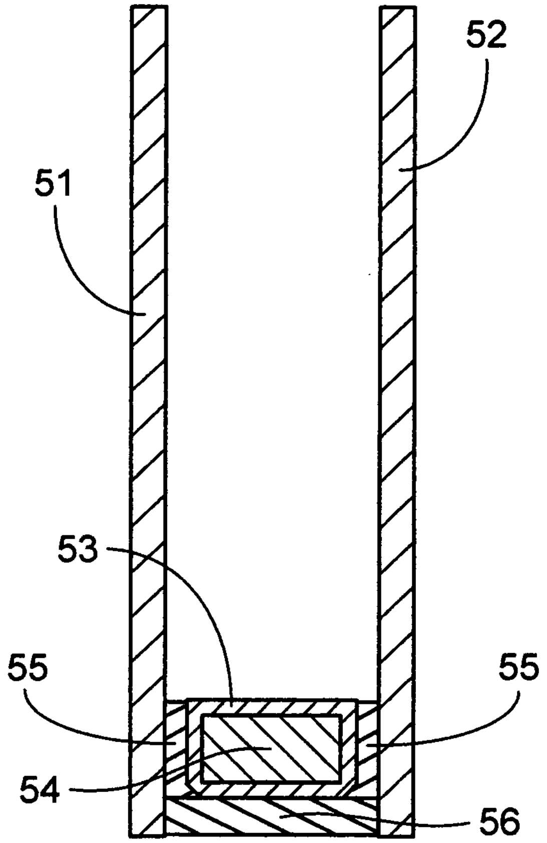
FIG. 5 is a diagrammatic cross-section of another alternative type of insulating glass unit.

The insulating glass unit of FIG. 5 also comprises glass panes 51, 52 separated by an aluminium box spacer comprising an aluminium hollow section 53 containing a desiccant 54. FIG. 5 shows a double seal unit in which a primary sealant 55 bonds the aluminium box 53 to the panes 51, 52 and a secondary sealant 56 seals the outer edge of the panes 51, 52 outside the box 53. The electronic information-bearing device can be incorporated in the secondary sealant 56 as it is applied to the unit.

The invention claimed is:

1. A process for the production of a sealed insulating glass unit comprising two glass sheets held apart by a spacer disposed about a periphery of the glass sheets with the spacer and the glass sheets defining a void space filled with gas, optionally with a sealant between the edges of the glass sheets outside the spacer, characterised in that the insulating glass unit contains an electronic device, having information relating to the origin of the insulating glass unit, manufacture of the insulating glass unit, properties of the insulating glass unit, or a combination thereof, and which is designed to be read from the device by means actuated from outside the insulating glass unit, the process comprising:

(i) embedding the device in a molten spacer;

(ii) applying the molten spacer onto a first of the two glass sheets; and (iii) assembling the first of the two glass sheets with the second of the two glass sheets so that the molten spacer is pressed against the first and the second glass sheets and bonds the first and the second glass sheets together, wherein the device is embedded within the spacer and concealed within the insulating glass unit.

2. A process for the production of a sealed insulating glass unit comprising two glass sheets held apart by a spacer disposed about a periphery of the glass sheets with the spacer and the glass sheets defining a void space filled with gas and a sealant between the edges of the glass sheets outside the spacer, characterised in that the insulating glass unit contains an electronic device, having information relating to the origin of the insulating glass unit, manufacture of the insulating glass unit, properties of the insulating glass unit, or a combination thereof, and which is designed to be read from the device by means actuated from outside the insulating glass unit, the process comprising:

(i) assembling a first of the two glass sheets with a second of the two glass sheets with the spacer disposed between the glass sheets at the periphery of the glass sheets, wherein the spacer and the two glass sheets define a void space;

(ii) embedding the device in the sealant while the sealant is fluid; and (iii) applying the sealant to the spacer such that the sealant is in contact with an external surface of the spacer, wherein the device is embedded within the sealant and concealed within the insulating glass unit.

3. A process according to claim 1, characterised in that information concerning product parameters relevant to the quality of the insulating glass unit is automatically transferred to the device during manufacture of the insulating glass unit.

4. A process according to claim 1, characterised in that the device is a rewritable electronic chip and information concerning environmental exposure history of the insulating glass unit is automatically transferred to said the device after manufacture of the insulating glass unit.

5. A process according to claim 2, characterised in that information concerning product parameters relevant to the quality of the insulating glass unit is automatically transferred to the device during manufacture of the insulating glass unit.

6. A process according to claim 2, characterised in that the device is a rewritable electronic chip and information concerning environmental exposure history of the insulating glass unit is automatically transferred to the device after manufacture of the insulating glass unit.

7. A process according to claim 1, wherein applying the molten spacer comprises applying the molten spacer as a strand onto the first of the two glass sheets along the periphery until the beginning and end of the strand are joined; and wherein assembling the first of the two glass sheets with the second of the two glass sheets further comprises pressing the two glass sheets together to a predetermined distance apart.

8. A process according to claim 1, wherein the device is embedded in the molten spacer before the molten spacer is applied onto the first of the two glass sheets.

9. A process according to claim 2, wherein the device is embedded in the sealant before the sealant is applied to the spacer.

* * * * *